United States Patent
Uehara et al.

(10) Patent No.: US 8,068,766 B2
(45) Date of Patent: Nov. 29, 2011

(54) ROTARY DRIVE DEVICE AND IMAGE FORMING APPARATUS

(75) Inventors: Takuya Uehara, Tokyo (JP); Joh Ebara, Kamakura (JP); Yohei Miura, Machida (JP); Takuya Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 700 days.

(21) Appl. No.: 12/216,946

(22) Filed: Jul. 14, 2008

(65) Prior Publication Data

US 2009/0017953 A1   Jan. 15, 2009

(30) Foreign Application Priority Data

Jul. 12, 2007 (JP) ................................. 2007-183566
Mar. 5, 2008 (JP) ................................. 2008-055373

(51) Int. Cl.
*G03G 15/00* (2006.01)
*G03G 15/01* (2006.01)
*F16H 48/06* (2006.01)
(52) U.S. Cl. ........................................ 399/167; 475/149
(58) Field of Classification Search .................. 399/167, 399/297, 299, 302, 308; 475/149, 151, 153
See application file for complete search history.

(56) References Cited

U.S. PATENT DOCUMENTS

| | | | |
|---|---|---|---|
| 4,147,501 A * | 4/1979 | Goshima et al. | 432/60 |
| 5,385,512 A * | 1/1995 | Moolenaar et al. | 475/153 |
| 6,859,635 B2 * | 2/2005 | Yabuki et al. | 399/299 |
| 6,893,371 B2 * | 5/2005 | Mills et al. | 475/149 |
| 7,294,080 B2 * | 11/2007 | Hoshino | 475/149 |
| 7,463,004 B2 * | 12/2008 | Burnett | 318/685 |
| 2004/0192485 A1 * | 9/2004 | Severinsson | 475/149 |
| 2008/0145102 A1 * | 6/2008 | Katoh et al. | 399/167 |

FOREIGN PATENT DOCUMENTS

| | | |
|---|---|---|
| CN | 1389358 A | 1/2003 |
| EP | 505140 A1 * | 9/1992 |
| EP | 1983383 A2 * | 10/2008 |
| JP | 05-024704 | 2/1993 |
| JP | 09211015 A * | 8/1997 |
| JP | 11-084863 | 3/1999 |
| JP | 2007-012144 | 1/2001 |
| JP | 2001227562 A * | 8/2001 |
| JP | 2003-215880 | 7/2003 |
| JP | 2003263065 A * | 9/2003 |
| JP | 2004-117499 | 4/2004 |
| JP | 2004232834 A * | 8/2004 |
| JP | 2005-128161 | 5/2005 |
| JP | 2006-009925 | 1/2006 |

* cited by examiner

*Primary Examiner* — David Gray
*Assistant Examiner* — Fred L Braun
(74) *Attorney, Agent, or Firm* — Harness, Dickey & Pierce, P.L.C.

(57) ABSTRACT

A rotary drive device includes a motor including a rotary shaft, a planetary gear mechanism, and a rotation position detector. The planetary gear mechanism decelerates a rotation output of the motor at a reference reduction ratio and includes an outer gear, multistage gears, and an output shaft. The outer gear is fixed to a housing of the motor. The multistage gears are provided inside the outer gear. The output shaft transmits the decelerated rotation output of the motor to an outside of the rotary drive device. The rotation position detector detects a rotation position of the output shaft to control rotation of the motor. The motor, the planetary gear mechanism, and the rotation position detector are combined into a single integrated unit and aligned in an axial direction of the rotary shaft of the motor.

12 Claims, 7 Drawing Sheets

ROTARY DRIVE DEVICE AND IMAGE FORMING APPARATUS

PRIORITY STATEMENT

The present patent application claims priority from Japanese Patent Application Nos. 2007-183566, filed on Jul. 12, 2007, and 2008-055373, filed on Mar. 5, 2008 in the Japan Patent Office, the entire contents of each of which are hereby incorporated herein by reference.

BACKGROUND OF THE INVENTION

1. Field of the Invention

Example embodiments generally relate to a rotary drive device and an image forming apparatus including the rotary drive device, for example, for providing an increased reduction ratio with a compact structure.

2. Description of the Related Art

A related-art image forming apparatus including a copier, a facsimile machine, a printer, or a multifunction printer having at least one of copying, printing, scanning, and facsimile functions, typically forms a toner image on a recording medium (e.g., a recording sheet) based on image data using an electrophotographic method.

For example, a charging device charges a surface of a photoconductor. An optical writer emits a light beam onto the charged surface of the photoconductor to form an electrostatic latent image on the photoconductor according to the image data. A development device develops the electrostatic latent image with a developer (e.g., toner) to form a toner image on the photoconductor. A primary transfer roller transfers the toner image formed on the photoconductor onto an intermediate transfer belt. After a secondary transfer roller transfers the toner image carried by the intermediate transfer belt onto the recording sheet, the toner image is fixed on the recording sheet by heat and pressure applied by a fixing device. Thus, the toner image is formed on the recording sheet.

When such image forming apparatus forms a color image, the image forming apparatus may include a plurality of photoconductors arranged along the intermediate transfer belt and a plurality of primary transfer rollers opposing the plurality of photoconductors across the intermediate transfer belt. For example, the plurality of photoconductors forms cyan, magenta, yellow, and black toner images, respectively, and the plurality of primary transfer rollers transfers the cyan, magenta, yellow, and black toner images from the photoconductors onto the intermediate transfer belt so that the cyan, magenta, yellow, and black toner images are superimposed on the intermediate transfer belt.

The image forming apparatus may further include a contact-separation mechanism designed to make the photoconductors and the primary transfer rollers contact and separate from the intermediate transfer belt. For example, when the image forming apparatus forms a monochrome image, the contact-separation mechanism separates the photoconductors for forming the cyan, magenta, and yellow toner images, respectively, and the primary transfer rollers opposing the photoconductors for forming the cyan, magenta, and yellow toner images from the intermediate transfer belt. The secondary transfer roller is separated from the intermediate transfer belt when no pressure is applied to the intermediate transfer belt before and after image formation. As a result, the photoconductors, the primary transfer rollers, and the secondary transfer roller may be protected from damage, thereby increasing the working life of the image forming apparatus while improving image quality.

Such contact-separation mechanism is activated by a rotary drive device using a planetary gear mechanism including multistage gears. The planetary gear mechanism includes a gear unit including a sun gear, a plurality of planetary gears, a planetary carrier, and an output shaft. The sun gear is fixed to the planetary carrier. The plurality of planetary gears is provided around the sun gear and engages the sun gear. Thus, when the sun gear rotates, the planetary gears rotate around the sun gear at a desired speed reduction ratio. The reduced rotation output is transmitted to the output shaft and transformed into movement of the contact-separation mechanism.

However, when a radial load is directly applied to the planetary gear mechanism over a long period of time, backlash (e.g., play) between the respective gears may fluctuate in a normal line direction. Such fluctuation of the backlash in the normal line direction may increase rotational resistance between the respective gears. When the backlash becomes too great, the gears may be excessively worn and damaged.

Therefore, there is a need for a technology to provide a rotary drive device including a planetary gear mechanism in which a plurality of gears can properly engage each other in order to obtain a large reduction ratio.

SUMMARY

At least one embodiment may provide a rotary drive device that includes a motor including a rotary shaft, a planetary gear mechanism to decelerate a rotation output of the motor at a reference reduction ratio, and a rotation position detector. The planetary gear mechanism includes an outer gear fixed to a housing of the motor, multistage gears provided inside the outer gear, and an output shaft to transmit the decelerated rotation output of the motor to an outside of the rotary drive device. The rotation position detector detects a rotation position of the output shaft to control rotation of the motor. The motor, the planetary gear mechanism, and the rotation position detector are combined into a single integrated unit and aligned in an axial direction of the rotary shaft of the motor.

At least one embodiment may provide a rotary drive device that includes a motor including a rotary shaft, a first deceleration mechanism to perform first deceleration for decelerating a rotation output of the motor at a reference reduction ratio, a second deceleration mechanism to perform second deceleration for decelerating the rotation output of the motor, a rotation position detector, and a case to store the second deceleration mechanism and the rotation position detector. The first deceleration mechanism includes an outer gear fixed to a housing of the motor, multistage gears provided inside the outer gear, and a first output shaft to transmit the decelerated rotation output of the motor. The second deceleration mechanism includes a rotation output receiver removably connected to the first output shaft and to receive the rotation output of the motor, a gear train to perform second deceleration for decelerating the rotation output of the motor received by the rotation output receiver at a reference reduction ratio, and a second output shaft to transmit the rotation output decelerated by the gear train to an outside of the rotary drive device. The rotation position detector detects a rotation position of the second output shaft to control rotation of the motor. The motor, the first deceleration mechanism, and the second deceleration mechanism are combined into a single integrated unit.

At least one embodiment may provide an image forming apparatus that includes a rotary drive device including a motor including a rotary shaft, a planetary gear mechanism to decelerate a rotation output of the motor at a reference reduction ratio, and a rotation position detector. The planetary gear mechanism includes an outer gear fixed to a housing of the motor, multistage gears provided inside the outer gear, and an output shaft to transmit the decelerated rotation output of the motor to an outside of the rotary drive device. The rotation position detector detects a rotation position of the output shaft to control rotation of the motor. The motor, the planetary gear mechanism, and the rotation position detector are combined into a single integrated unit and aligned in an axial direction of the rotary shaft of the motor.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
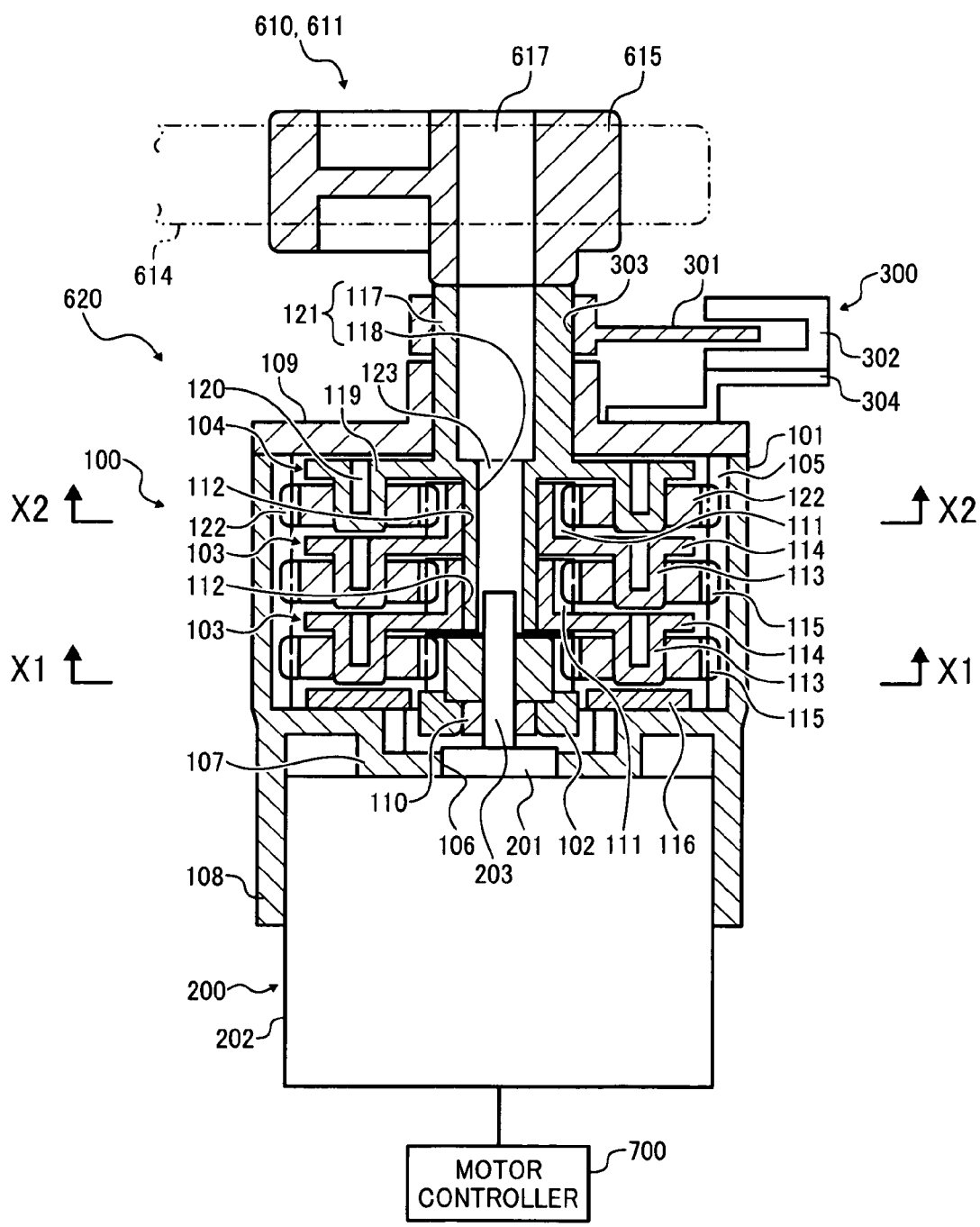
FIG. 1 is a longitudinal sectional view of a rotary drive device according to an example embodiment of the present invention.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, in particular to FIG. 1, a first contact-separation mechanism 610 or a second contact-separation mechanism 611 and a rotary drive device 620 according to an example embodiment of the present invention are described.

FIG. 1 is a longitudinal sectional view of the first contact-separation mechanism 610 or the second contact-separation mechanism 611 and the rotary drive device 620. The first contact-separation mechanism 610 or the second contact-separation mechanism 611 includes an arm 614, a plate cam 615, and/or a connection shaft 617. The rotary drive device 620 includes a planetary gear mechanism 100, a motor 200, a first rotation position detector 300, and/or a motor controller 700. The planetary gear mechanism 100 includes an outer gear 101, a second sun gear 102, a first planetary carrier member 103, and/or a second planetary carrier member 104. The outer gear 101 includes a gear 105, an opening 106, a divider 107, a holding member 108, and/or a lid 109. The first planetary carrier member 103 includes a first sun gear 111, a shaft hole 112, a support axis 113, a first planetary carrier 114, a first planetary gear 115, and/or a filler piece 116. The second planetary carrier member 104 includes a hollow shaft 121, a though-hole 123, a second planetary carrier 119, a support shaft 120, and/or a second planetary gear 122. The hollow shaft 121 includes an output shaft 117 and/or a support shaft 118. The motor 200 includes a housing 202, a circular convex member 201, and/or a rotary shaft 203. The first rotation position detector 300 includes a first dog 301, a first sensor 302, an attachment hole 303, and/or a stay 304. The second sun gear 102 includes a coupling 110.

Figure 2:
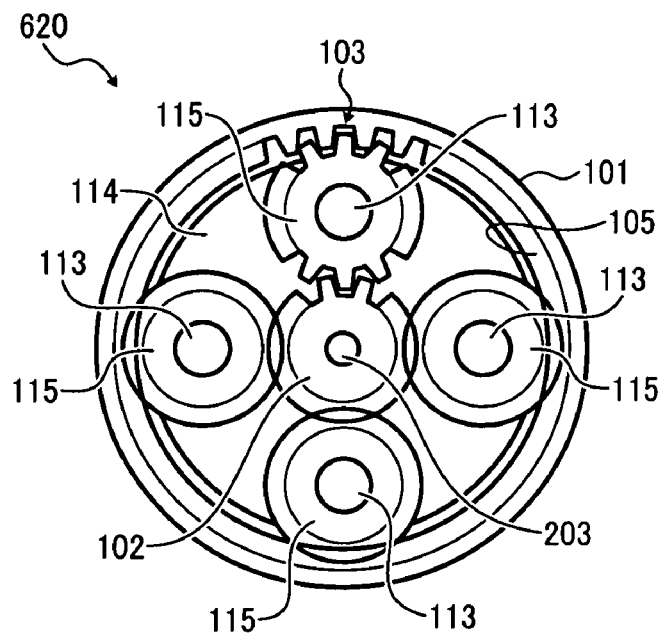
FIG. 2 is a sectional view (according to an example embodiment) of the rotary drive device shown in FIG. 1 as taken along line X1-X1 of FIG. 1.
Figure 3:
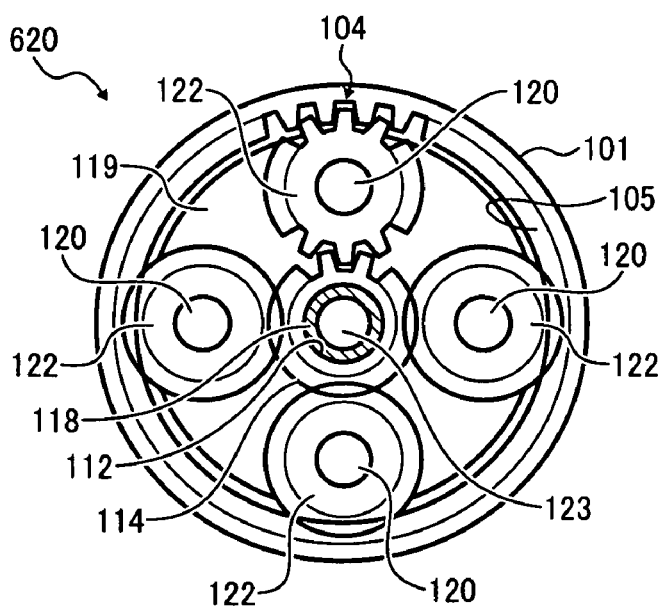
FIG. 3 is a sectional view (according to an example embodiment) of the rotary drive device shown in FIG. 1 as taken along line X2-X2 of FIG. 1.
Figure 4:
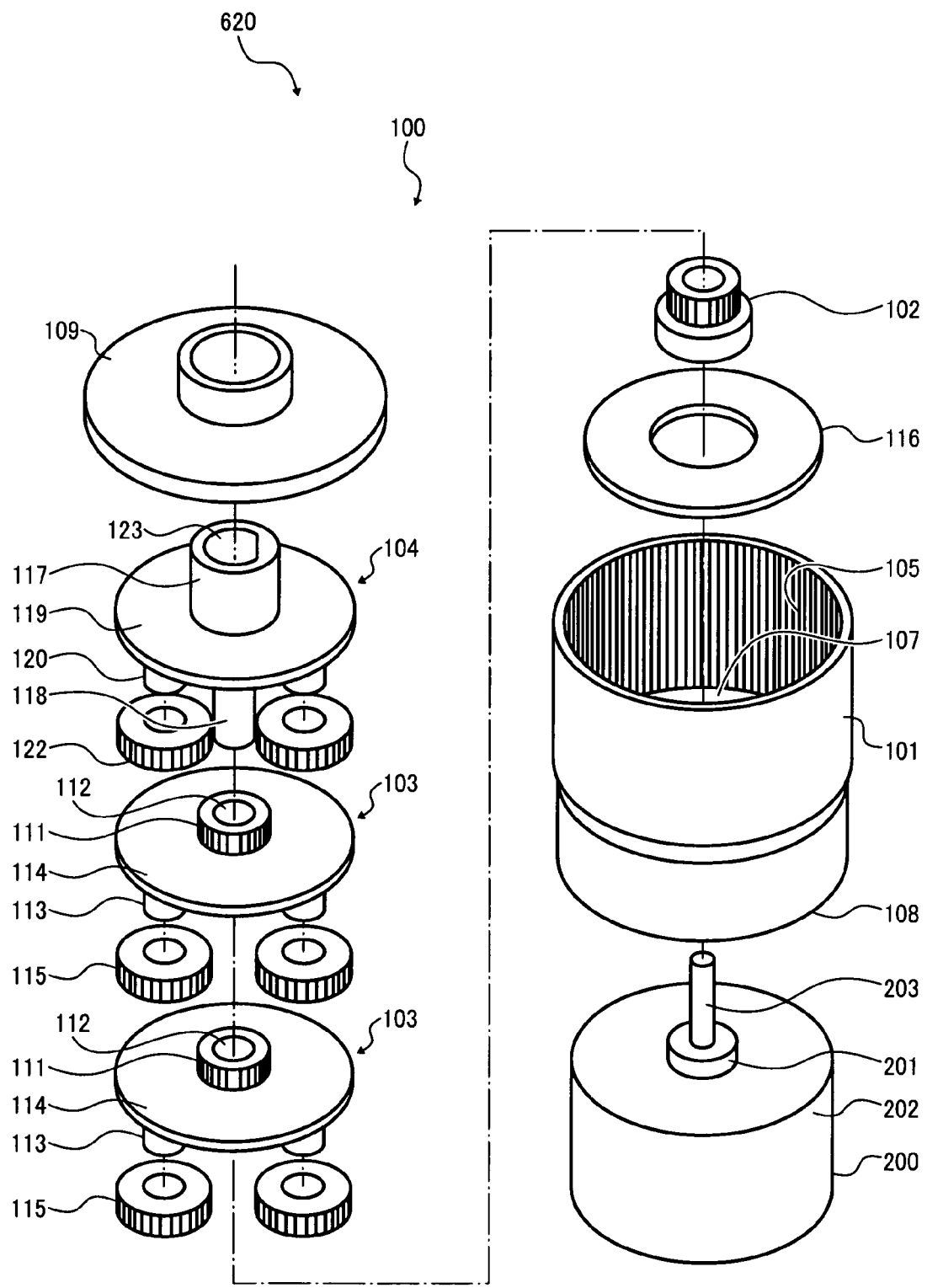
FIG. 4 is an exploded perspective view (according to an example embodiment) of the rotary drive device shown in FIG. 1.

FIG. 2 is a sectional view of the rotary drive device 620 along line X1-X1 of FIG. 1. FIG. 3 is a sectional view of the rotary drive device 620 as taken along line X2-X2 of FIG. 1. FIG. 4 is an exploded perspective view of the rotary drive device 620.

As illustrated in FIG. 4, the outer gear 101 has a substantially cylindrical shape. The divider 107 divides an inner circumferential surface of the outer gear 101. The opening 106 (depicted in FIG. 1) is provided in the divider 107. The tooth-shaped gear 105 is provided on one inner circumferential surface of the outer gear 101. The holding member 108 is provided on another inner circumferential surface of the outer gear 101 and has a diameter sufficient to be inserted into the housing 202 of the motor 200. As illustrated in FIG. 1, the circular convex member 201, provided on the housing 202 of the motor 200, is inserted into the opening 106 of the divider 107. The gear 105, the divider 107, and the holding member 108 are integrally molded using a resin material.

The lid 109 caps the outer gear 101 containing the first planetary carrier member 103 and the second planetary carrier member 104. The lid 109 supports the output shaft 117 of the second planetary carrier member 104 and protrudes outward.

As illustrated in FIG. 2, the housing 202 of the motor 200 is inserted into the holding member 108 of the outer gear 101 until a front surface of the motor 200 contacts the divider 107 of the outer gear 101. A fastening screw (not shown) fixes and holds the motor 200.

The second sun gear 102 is attached (e.g., fixed) to the rotary shaft 203 of the motor 200 extending towards the gear 105 of the outer gear 101 via the coupling 110 and engaged with the lowermost first planetary gear 115.

As illustrated in FIG. 4, the first sun gear 111 of the first planetary carrier member 103 has a flange-like bottom surface. The shaft hole 112 is provided in a center of the first sun gear 111 and has a substantially convex shape in a longitudinal section. The first planetary carrier 114 is provided under the flanged bottom surface of the first sun gear 111. Four support axes 113, which support four first planetary gears 115, protrude from the first planetary carrier 114 and are disposed at intervals of 90 degrees in a circumferential direction thereof around the shaft hole 112, as illustrated in FIG. 3. The first planetary carrier 114 and the first sun gear 111 are integrally molded using a resin material. The first planetary gears 115 also include a resin material.

According to this example embodiment, as illustrated in FIGS. 1 and 2, when the second sun gear 102 engages the first planetary gear 115, the first planetary gear 115 engages the outer gear 101, so that the lower first planetary carrier member 103 may be engaged with the outer gear 101. When the first planetary gear 115 of the upper first planetary carrier member 103 having a structure equivalent to that of the lower first planetary carrier member 103 engages the first sun gear 111 of the lower first planetary carrier member 103, the first planetary gear 115 engages the outer gear 101, so that the upper first planetary carrier member 103 may be engaged with the outer gear 101.

As illustrated in FIG. 1, the circular filler piece 116 is provided between the lower first planetary gear 115 and the divider 107 to adjust a clearance therebetween.

According to this example embodiment, the upper and lower first planetary carrier members 103 are provided in the planetary gear mechanism 100. However, any number of the first planetary carrier members 103 may be provided. For example, a plurality of the first planetary carrier members 103 may be provided so as to obtain a desired reduction ratio. Alternatively, only a single first planetary carrier member 103 may be provided.

As illustrated in FIG. 4, the output shaft 117 is provided at one side of the hollow shaft 121 (depicted in FIG. 1) of the second planetary carrier member 104 and transmits a rotation output (e.g., a rotation force) of the motor 200 to an outside of the rotary drive device 620, while the support shaft 118 is provided at another side of the hollow shaft 121 and is inserted into the shaft hole 112. The second planetary carrier 119, having a flange-like shape, is provided between the output shaft 117 and the support shaft 118. Four support shafts 120, which support four second planetary gears 122, protrude from a surface of the second planetary carrier 119 on which the support shaft 118 is provided, and are disposed at intervals of 90 degrees in a circumferential direction thereof around a center of the support shaft 118. The hollow shaft 121, the second planetary carrier 119, and the support shafts 120 are integrally molded with a resin material. Also, the second planetary gears 122 include a resin material.

The through-hole 123 penetrates the output shaft 117 and the support shaft 118 integrally molded with each other. An inner diameter of the through-hole 123 changes at the second planetary carrier 119, that is, a border between the output shaft 117 and the support shaft 118. Specifically, an inner diameter of a portion of the through-hole 123 in the output shaft 117 is larger than an inner diameter of a portion of the through-hole 123 in the support shaft 118. The rotary shaft 203 of the motor 200 is loosely inserted into the portion of the through-hole 123 in the support shaft 118 according to a length of the rotary shaft 203 of the motor 200 or a size of each constituent element, so as to reduce or prevent interference therebetween. The output shaft 117, opposite the support shaft 118, is engaged with a shaft body of an external device to be rotated.

As illustrated in FIG. 1, the plate cam 615 of the first contact-separation mechanism 610 or the second contact-separation mechanism 611 is fixed to the connection shaft 617 and causes a primary transfer roller (not shown) or a secondary transfer roller (not shown) of an image forming apparatus (not shown) to contact and separate from an intermediate transfer belt (not shown). The connection shaft 617 is inserted into the through-hole 123 in the output shaft 117.

As illustrated in FIGS. 3 and 4, when the second planetary gear 122 engages the first sun gear 111 of the upper first planetary carrier member 103 engaged with the outer gear 101, the second planetary gear 122 engages the outer gear 101, while the support shaft 118 is inserted into the shaft holes 112 of the upper and lower first planetary carrier members 103, so as to support the upper and lower first planetary carrier members 103.

The motor 200 is electrically driven and is supported by the holding member 108 of the outer gear 101. A type of the motor 200 varies depending on application of the rotary drive device 620. According to this example embodiment, the motor 200 includes a brush and may be stopped by a short brake applied by the motor controller 700.

As illustrated in FIG. 1, the first dog 301 of the first rotation position detector 300 is fitted into the output shaft 117 through the attachment hole 303 and has a plate-like shape, spreading out in a fan-like shape at a desired detection angle along a circumferential direction thereof.

The first sensor 302 is a transmissive light sensor including a light emitter and a light receiver, and is fixed to the stay 304 extending from the lid 109 or an outer circumferential surface of the outer gear 101, such that the first dog 301 may block light emitted from the light emitter to the light receiver. Therefore, the first sensor 302 may precisely detect a rotational position of the output shaft 117 based on whether or not the rotating first dog 301 blocks the light, thus sending an operation timing signal of the motor 200.

Referring again to FIGS. 1 to 4, a description is now given of a series of mechanical operations performed by the rotary drive device 620 according to this example embodiment.

It is to be noted that, to facilitate the description, a rotation operation control of braking the motor 200 by the motor controller 700, stopping of the motor 200 by the first rotation position detector 300, and the like, is described later.

When the motor 200 is powered on to drive to rotate the rotary shaft 203, the second sun gear 102 fixed to the rotary shaft 203 starts rotating, and the lower first planetary gear 115 engaging the second sun gear 102 moves around the second sun gear 102, causing the lower first planetary carrier 114 supporting the lower first planetary gear 115 to start first decelerated rotation. The outer gear 101 supporting the housing 202 of the motor 200 does not rotate.

According to the decelerated rotation of the lower first planetary carrier 114, the lower first sun gear 111 integrally molded with the lower first planetary carrier 114 starts rotating. The upper first planetary gear 115 engaging the lower first sun gear 111 moves around the lower first sun gear 111, causing the upper first planetary carrier 114 supporting the upper first planetary gear 115 to start second decelerated rotation.

According to the second decelerated rotation of the upper first planetary carrier 114, the upper first sun gear 111 integrally molded with the upper first planetary carrier 114 starts rotating. The second planetary gear 122 engaging the upper first sun gear 111 moves around the upper first sun gear 111, causing the second planetary carrier 119 supporting the second planetary gear 122 to start third decelerated rotation.

Due to the above decelerated rotations, the output shaft 117 integrally molded with the second planetary carrier 119 may rotate at a desired reduction speed lower than a rotation speed of the rotary shaft 203 of the motor 200.

When the support shaft 118 integrally molded with the second planetary carrier 119 slidably contacts the shaft holes 112 of the upper and lower first planetary carrier members 103 to support the upper and lower first planetary carrier members 103, a radial load may be applied to the output shaft 117 over an extended period of time. However, a backlash formed between the respective gears in a normal line direction may not fluctuate, so that the respective gears may be properly engaged with each other.

According to the above-described example embodiment, the planetary gear mechanism 100 including multistage gears, the motor 200, and the first rotation position detector 300 are provided as a unit, thereby facilitating assembly of the rotary drive device 620 and improving maintenance thereof. Even when a radial load is applied to the output shaft 117 over an extended period of time, rotation resistance of the output shaft 117 is not increased, reducing wear on and damage to the first and second planetary gears 115 and 122, and the like.

Figure 5:
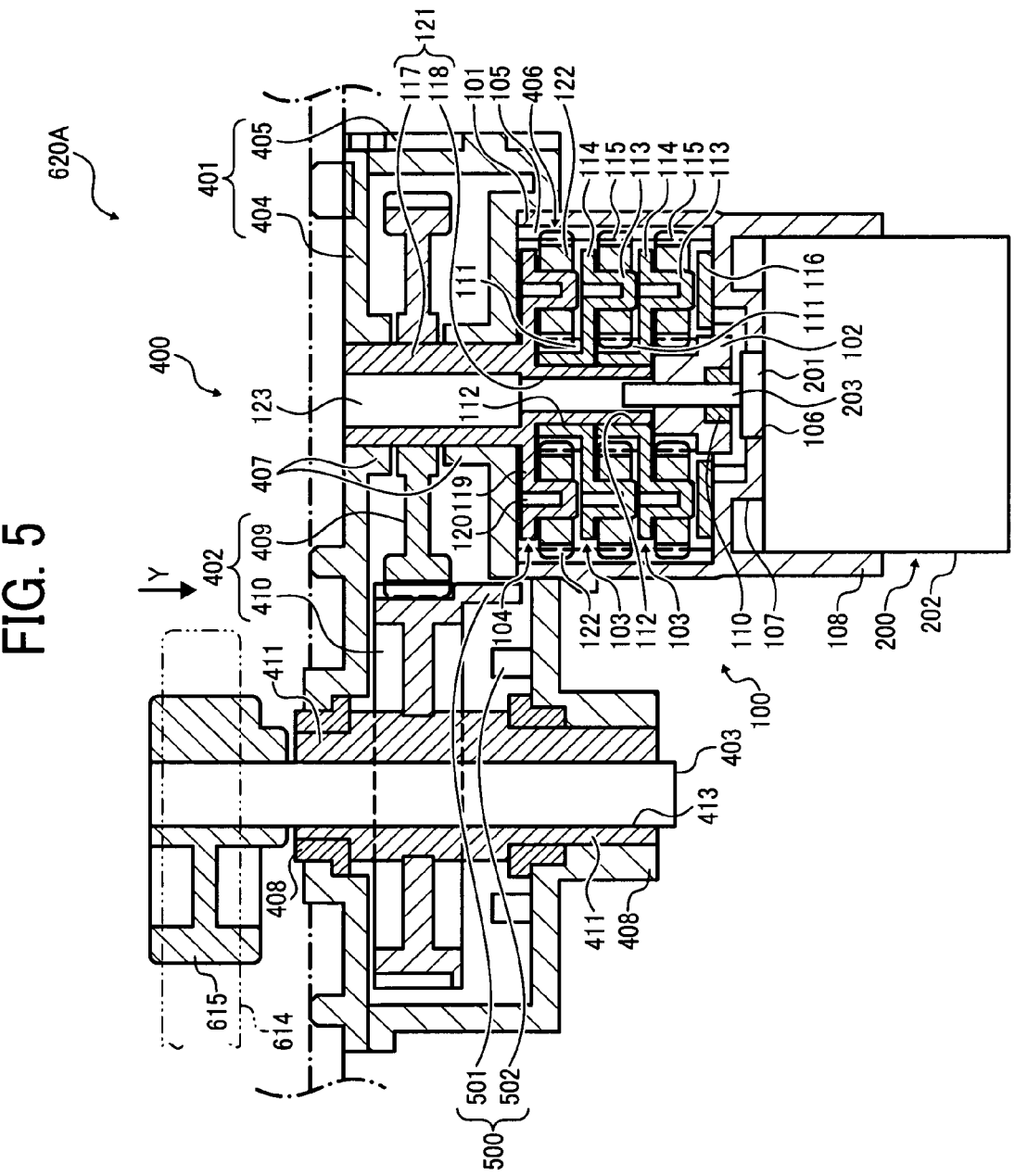
FIG. 5 is a longitudinal sectional view of a rotary drive device according to another example embodiment of the present invention.
Figure 6:
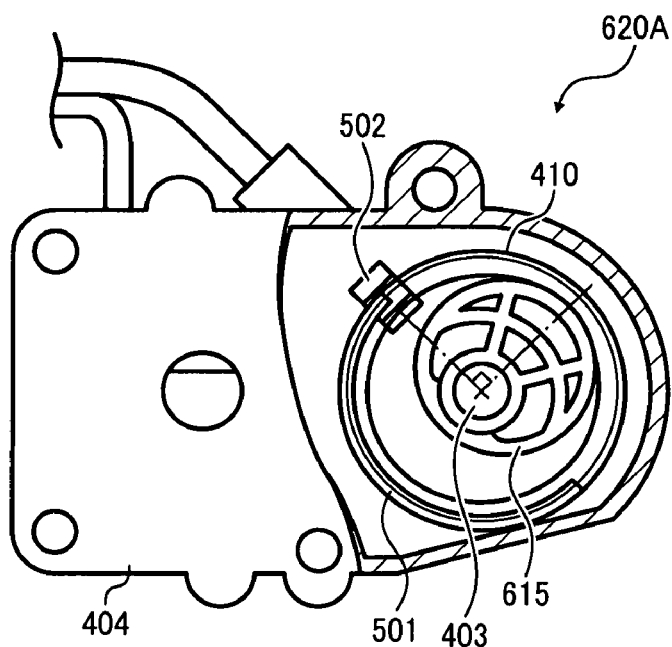
FIG. 6 is a partial cutaway view (according to an example embodiment) of the rotary drive device shown in FIG. 5 as seen from arrow Y in FIG. 5.
Figure 7:
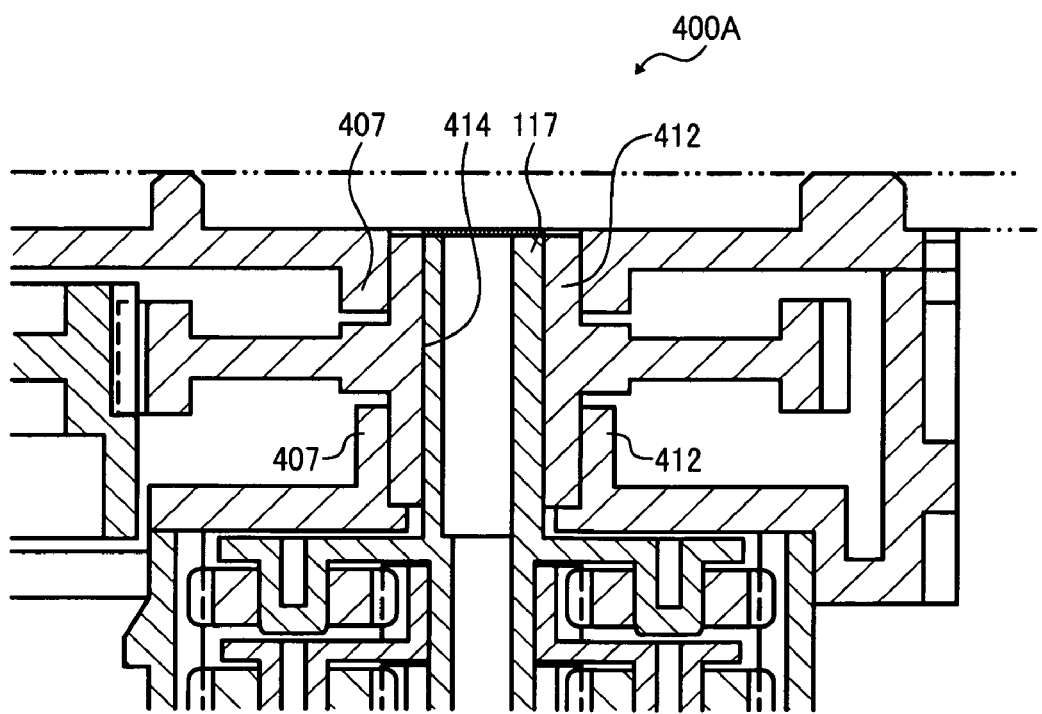
FIG. 7 is a partial sectional view (according to an example embodiment) of one modification example of a second deceleration mechanism included in the rotary drive device shown in FIG. 5.

Referring to FIGS. 5 to 7, a description is now given of a rotary drive device 620A according to another example embodiment. FIG. 5 is a schematic longitudinal sectional view of the rotary drive device 620A. FIG. 6 is a partial cutaway view of the rotary drive device 620A as seen from arrow Y in FIG. 5. As illustrated in FIG. 5, the rotary drive device 620A includes a second deceleration mechanism 400 and/or a second rotation position detector 500. The second rotation position detector 500 is provided instead of the first rotation position detector 300 of the rotary drive device 620 (depicted in FIG. 1).

The second deceleration mechanism 400 includes a case 401, a gear train 402, and/or a second output shaft 403. The case 401 includes a panel 404 and/or a container 405. The container 405 includes a concave member 406, a driving gear bearing 407, and/or a driven gear bearing 408. The gear train 402 includes a driving gear 409, a driven gear 410, and/or a boss 411. The driven gear 410 includes a shaft hole 413. The second rotation position detector 500 includes a second dog 501 and/or a second sensor 502. The other elements of the rotary drive device 620A are equivalent to those of the rotary drive device 620 (depicted in FIG. 1) except that the outer gear 101 of the planetary gear mechanism 100 does not include the lid 109.

The case 401 stores the second deceleration mechanism 400 and the second rotation position detector 500. The panel 404 is attached to a desired external device. The container 405 is substantially U-shaped.

The concave member 406 is provided on one side (e.g., a right side in FIG. 5) of a back surface of the container 405, such that an end of the outer gear 101 is detachably inserted or fitted thereto. The tubular driving gear bearing 407 is provided in a middle of the concave member 406 and extends toward an inside of the case 401. The driving gear bearing 407 is also provided in a position corresponding to the panel 404 and supports the output shaft 117 of the rotary drive device 620A. The driven gear bearing 408 is provided on the opposite side of the driving gear bearing 407 (e.g., a left side in FIG. 5) and supports the driven gear 410.

The case 401 is detachably connected to the rotary drive device 620A via a screw (not shown), while the end of the outer gear 101 is inserted into the concave member 406. The driving gear bearing 407 supports the output shaft 117.

The driving gear 409 of the gear train 402, which rotates according to rotation of the output shaft 117, is removably inserted into the output shaft 117 supported by the driving gear bearing 407. The boss 411 protrudes from both sides of the second output shaft 403 and is supported by the driven gear bearing 408 while engaged with the driving gear 409 for driving the driven gear 410.

FIG. 7 illustrates a second deceleration mechanism 400A as a modification example of the second deceleration mechanism 400 depicted in FIG. 5. The second deceleration mechanism 400A includes a boss 412 and a shaft hole 414. The other elements of the second deceleration mechanism 400A are equivalent to those of the second deceleration mechanism 400.

Although the driving gear 409 (depicted in FIG. 5) is directly supported by the output shaft 117, like the driven gear 410 (depicted in FIG. 5), the boss 412 protruding from both sides of the output shaft 117 may be supported by the driving gear bearing 407, while the output shaft 117 is removably inserted into the shaft hole 414. The shaft hole 414 functions as a rotation output receiver for receiving a rotation output (e.g., a rotation force) from the output shaft 117.

As illustrated in FIG. 5, the gear train 402 transmits the rotation output received by the rotation output receiver to the second output shaft 403 at a desired reduction ratio. However, the reduction ratio may not be an intended ratio. For example, a center of the second output shaft 403 may be shifted from a center of the output shaft 117, such that a gear ratio between the driving gear 409 and the driven gear 410 is 1:1 in order to increase a size of an installation space of the rotary drive device 620A. Alternatively, when a great amount of radial load is applied to the second output shaft 403, the gear train 402 may be provided as a buffer member for directly receiving the radial load.

The second output shaft 403 is inserted into the shaft hole 413 provided in the driven gear 410 and engaged with a shaft of an external device to be rotated. As illustrated in FIGS. 5 and 6, the plate cam 615 for causing primary transfer rollers and a secondary transfer roller (described below) to contact and separate from an intermediate transfer belt (described below) is fixed to the second output shaft 403. Although the second output shaft 403 and the driven gear 410 are separated from each other, they may be combined with each other by extending the boss 411 to function as the second output shaft 403.

As illustrated in FIG. 6, the second dog 501 of the second rotation position detector 500 is convexly provided at a reference angle along a circumferential side surface of the driven gear 410.

As illustrated in FIG. 5, the second sensor 502 of the second rotation position detector 500 is a transmissive light sensor including a light emitter and a light receiver, and provided between the driving gear 409 and the driven gear 410 of the gear train 402 while being fixed to an inside of the case 401, such that the second dog 501 may shield light transmitted from the light emitter to the light receiver. Therefore, the second sensor 502 may detect a rotational position of the output shaft 117 based on information as to whether or not the rotating second dog 501 shields the light, so that the second sensor 502 may transmit an operation timing signal of the motor 200.

Like the rotary drive device 620 (depicted in FIG. 1), the rotary drive device 620A also performs a series of mechanical operation including three decelerations by the planetary gear mechanism 100. When the driven gear 410 rotates according to rotation of the driving gear 409 removably inserted into the output shaft 117 integrally molded with the second planetary carrier 119, the second output shaft 403, which is inserted into the shaft hole 413 of the driven gear 410, may rotate.

According to this example embodiment, the gear train 402 is provided in the second deceleration mechanism 400 to decelerate the rotation output received by the rotation output receiver (e.g., the shaft holes 413 and 414 depicted in FIGS. 5 and 7, respectively) and the second output shaft 403 (depicted in FIG. 5) at a reference reduction ratio, thereby controlling deceleration of the rotary drive device 620A, while preventing a radial load from directly being applied to the planetary gear mechanism 100. Therefore, the rotary drive device 620A may provide an improved reliability.

In addition, the rotary drive device 620A may be used as a variable driving device by adjusting the reduction ratio of the gear train 402. Further, like the rotary drive device 620 depicted in FIG. 1, the rotary drive device 620A may be provided as a unit by removing the second deceleration mechanism 400, and thereby used as a driving module shared by a plurality of devices, achieving cost reduction.

Figure 8:
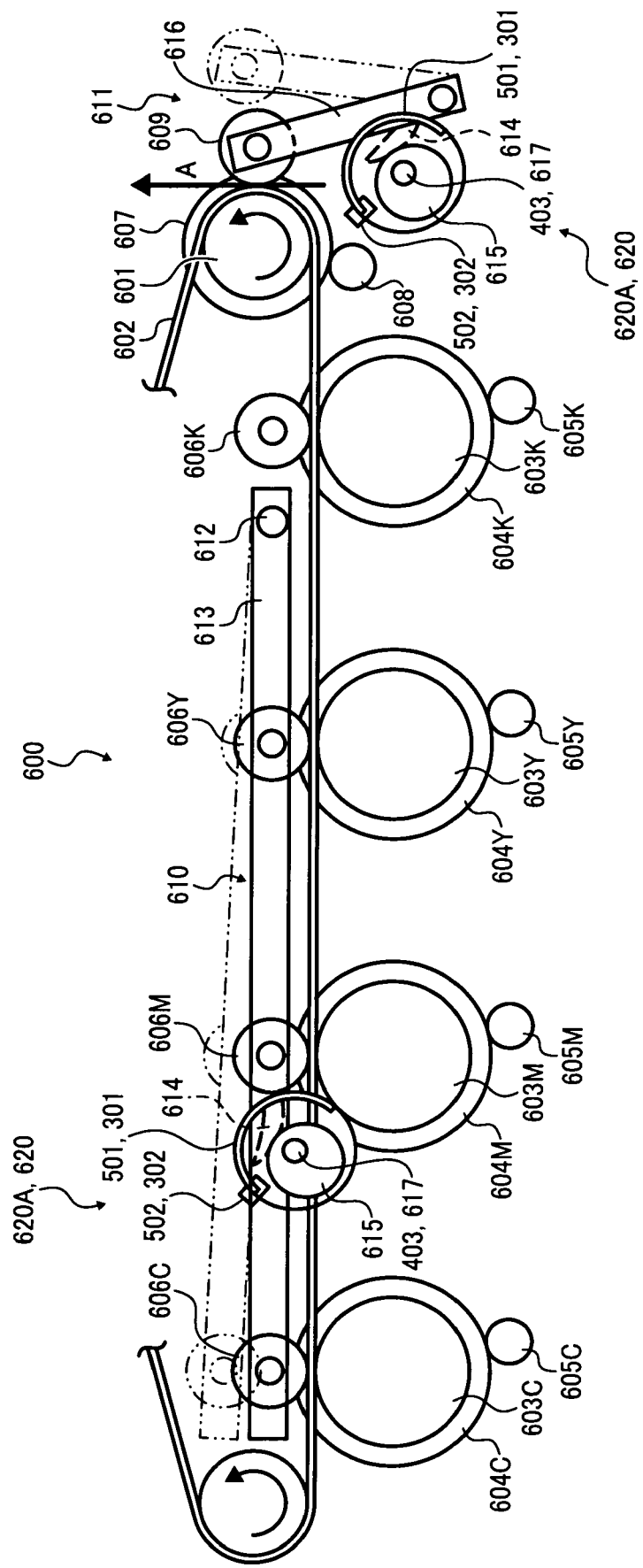
FIG. 8 is a schematic view of an image forming apparatus according to yet another example embodiment of the present invention.

Referring to FIG. 8, a description is now given of an image forming apparatus 600 including the rotary drive device 620 or 620A. FIG. 8 is a schematic view thereof. The image forming apparatus 600 includes an intermediate transfer belt 602, an intermediate transfer belt driving roller 601, photoconductor drums 603C, 603M, 603Y, and 603K, photoconductor drum reduction gears 604C, 604M, 604Y, and 604K, photoconductor drum driving motors 605C, 605M, 605Y, and 605K, primary transfer rollers 606C, 606M, 606Y, and 606K, an intermediate transfer belt reduction gear 607, an intermediate transfer belt driving motor 608, a secondary transfer roller 609, the first contact-separation mechanism 610, and/or the second contact-separation mechanism 611. The first contact-separation mechanism 610 includes a rotation point 612, a frame 613, the arm 614, and/or the plate cam 615. The first contact-separation mechanism 610 further includes the connection shaft 617 or the second output shaft 403. The second contact-separation mechanism 611 includes a link 616, the arm 614, and/or the plate cam 615. The second contact-separation mechanism 611 further includes the connection shaft 617 or the second output shaft 403.

The first contact-separation mechanism 610 is driven by one rotary drive device 620 or 620A and the second contact-separation mechanism 611 is driven by another rotary drive device 620 or 620A.

The image forming apparatus 600 forms a full color image by electrophotography. The intermediate transfer belt 602 is looped around a plurality of rollers including the intermediate transfer belt driving roller 601. Four photoconductor drums 603C, 603M, 603Y, and 603K are provided in order along the intermediate transfer belt 602 in a direction of rotation of the intermediate transfer belt 602 and form cyan, magenta, yellow and black toner images, respectively. The photoconductor drum reduction gears 604C, 604M, 604Y, and 604K rotate the photoconductor drums 603C, 603M, 603Y, and 603K, respectively. The photoconductor drum driving motors 605C, 605M, 605Y, and 605K include gears (not shown) engaged with the photoconductor drum reduction gears 604C, 604M, 604Y, and 604K to rotate the photoconductor drums 603C, 603M, 603Y, and 603K, respectively. The primary transfer rollers 606C, 606M, 606Y, and 606K oppose the photoconductor drums 603C, 603M, 603Y, and 603K, respectively, via the intermediate transfer belt 602 and generate a transfer electrical field therebetween. The intermediate transfer belt reduction gear 607 rotates the intermediate transfer belt driving roller 601. The intermediate transfer belt driving motor 608, which may be included in the rotary drive device 620 or 620A, includes a gear (not shown) engaged with the intermediate transfer belt reduction gear 607 to rotate the intermediate transfer belt 602. The secondary transfer roller 609 opposes the intermediate transfer belt reduction gear 607 via the intermediate transfer belt 602 and forms a transfer electrical field therebetween.

The first contact-separation mechanism 610 swings to move the primary transfer rollers 606C, 606M, and 606Y to cause the primary transfer rollers 606C, 606M, and 606Y to contact and separate from the intermediate transfer belt 602. The second contact-separation mechanism 611 swings to move the secondary transfer roller 609 to cause the secondary transfer roller 609 to contact and separate from the intermediate transfer belt 602.

The rotation point 612 of the first contact-separation mechanism 610 is provided in the vicinity of the primary transfer roller 606K. The frame 613 of the first contact-separation mechanism 610 rotatably supports the primary transfer rollers 606C, 606M, and 606Y. The arm 614 of the first contact-separation mechanism 610 protrudes from a middle portion of the frame 613 between the primary transfer rollers 606C and 606M. The plate cam 615 of the first contact-separation mechanism 610 contacts the arm 614.

The plate cam 615 is fixed to the output shaft 117 (depicted in FIG. 1) or the second output shaft 403 (depicted in FIG. 5) and has a disc-like shape with a center of rotation offset from a center thereof so as to form a cam curve shaped like a symmetrical mountain. The first dog 301 or the second dog 501 is circumferentially provided at an angle of 180 degrees. The first sensor 302 or the second sensor 502, the plate cam 615, and the first dog 301 or the second dog 501 are disposed in such a manner that the first sensor 302 or the second sensor 502 may detect a position (e.g., a maximum shift position) of the plate cam 615 when there is a maximum distance between the arm 614 and a center of rotation of the plate cam 615, and a position (e.g., a minimum shift position) of the plate cam 615 when there is a minimum distance between the arm 614 and the center of rotation of the plate cam 615. An arrangement of the second sensor 502, the second dog 501, and the plate cam 615 is illustrated in FIG. 6.

Accordingly, due to rotation of the plate cam 615 driven by the rotary drive device 620, as illustrated in FIG. 8, the frame 613 pivots around the rotation point 612 provided in the vicinity of the primary transfer roller 606K via the arm 614 contacting the rotating plate cam 615. Thus, the first contact-separation mechanism 610 causes the primary transfer rollers 606C, 606M, and 606Y to contact and separate from the intermediate transfer belt 602. It is to be noted that a pressing member (not shown) presses the frame 613 downwards so that the plate cam 615 is not separated from the arm 614.

One end of the link 616 of the second contact-separation mechanism 611 rotatably supports the secondary transfer roller 609, while another end is pivotably attached to a housing (not shown) of the image forming apparatus 600. The arm 614 of the second contact-separation mechanism 611 protrudes from a middle portion of the link 616 to face the photoconductor drum 603K. The plate cam 615 of the second contact-separation mechanism 611, which is equivalent to the plate cam 615 of the first contact-separation mechanism 610, is fixed to the output shaft 117 of the rotary drive device 620 or the second output shaft 403 of the rotary drive device 620A while contacting the arm 614.

Accordingly, due to rotation of the plate cam 615 driven by the rotary drive device 620 or 620A, the link 616 pivots around a position of the end thereof pivotably attached to the housing of the image forming apparatus 600 via the arm 614 contacting the plate cam 615. Thus, the second contact-separation mechanism 611 may cause the secondary transfer roller 609 to contact and separate from the intermediate transfer belt 602. It is to be noted that a pressing member (not shown) presses the link 616 toward the plate cam 615, so that the plate cam 615 may not be separated from the arm 614.

Figure 9:
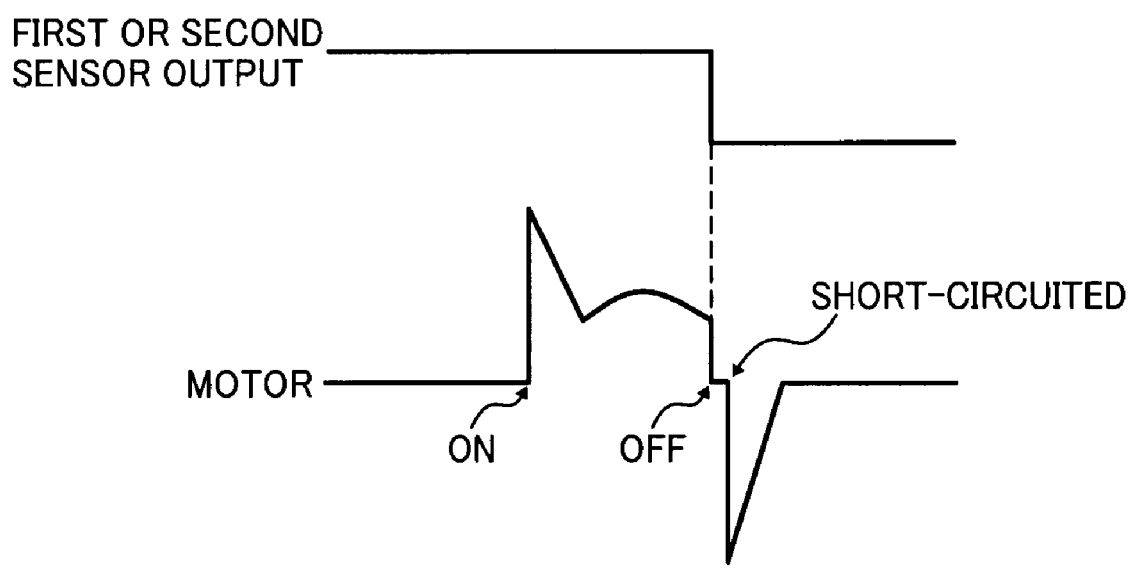
FIG. 9 is a diagram (according to an example embodiment) illustrating operation timing of stopping of a motor included in the image forming apparatus shown in FIG. 8.

Referring to FIG. 9, a description is now given of the motor controller 700 depicted in FIG. 1. FIG. 9 is a diagram illustrating operation timing of stopping the motor 200 depicted in FIG. 1.

The motor controller 700 stops supplying power to the motor 200 based on a operation timing signal transmitted from the first sensor 302 (depicted in FIG. 1) of the first rotation position detector 300 or from the second sensor 502 (depicted in FIG. 5) of the second rotation position detector 500. After a reference time period passes after the motor 200 is powered off, the motor controller 700 short-circuits a connection between positive and negative terminals of the motor 200 to cause the plate cam 615 to stop at a reference position. That is, when the operation timing signal transmitted from the first sensor 302 or from the second sensor 502 switches between a rise of the signal (e.g., when the first sensor 302 or the second sensor 502 detects the first dog 301 or the second dog 501) and a fall of the signal (e.g., when the first sensor 302 or the second sensor 502 does not detect the first dog 301 or the second dog 501) whenever the plate cam 615 rotates by 180 degrees, the motor controller 700 stops supplying power to the motor 200. For example, after 50 msec of a reference time period passes, the motor controller 700 short-circuits the motor 200 to cause the plate cam 615 to stop at the maximum shift position or the minimum shift position.

When the motor 200 is short-circuited at the time of rising or falling of the signal, the brush of the motor 200 may be sparked, which causes wearing of the brush. However, when the motor 200 is short-circuited after reduction of a rotation speed by using a rotational load generated by the power-off of the motor 200, such sparking of the brush of the motor 200 may be reduced (e.g., an electrical current flowing in the opposite direction is reduced), thereby increasing the working life of the motor 200. The motor controller 700 controls power supply to the motor 200 based on a command transmitted from the image forming apparatus 600 according to an image formation status, for example, a switch between a monochrome image formation mode and a full-color image formation mode, and completion of image formation.

According to the above-described example embodiment, in color image formation, the image forming apparatus 600 activates the first contact-separation mechanism 610 to cause the primary transfer rollers 606C, 606M, and 606Y to contact the intermediate transfer belt 602, respectively. When the intermediate transfer belt 602 rotates in a counter-clockwise direction, the toner images in respective colors formed on the photoconductor drums 603C, 603M, 603Y, and 603K are primarily transferred and superimposed onto the intermediate transfer belt 602 due to a transfer electrical field generated between the primary transfer rollers 606C, 606M, 606Y, and 606K and the photoconductor drums 603C, 603M, 603Y, and 606K respectively. When a recording sheet passes through a nip formed between the intermediate transfer belt 602 and the secondary transfer roller 609 (e.g., in a direction of A in FIG. 8), the cyan, magenta, yellow, and black toner images superimposed on the intermediate transfer belt 602 are secondarily transferred onto the recording sheet. Thereafter, a fixing device (not shown) fixes the toner images on the recording sheet by heat and pressure.

In monochrome image formation, the first contact-separation mechanism 610 causes the primary transfer rollers 606C, 606M, and 606Y to separate from the intermediate transfer belt 602, respectively.

Therefore, as described above, based on the image formation status, for example, switch between the monochrome image formation mode and the full color image formation mode and finish of image formation, the motor 200 is powered on to rotate the plate cam 615 by 180 degrees, the motor 200 stops at the maximum shift position or the minimum shift position of the plate cam 615, the first contact-separation mechanism 610 causes the primary transfer rollers 606C, 606M, and 606Y to contact and separate from the intermediate transfer belt 602, and the second contact-separation mechanism 611 causes the secondary transfer roller 609 to contact and separate from the intermediate transfer belt 602. Such contact and separate operation may lengthen a useful life of each element of the image forming apparatus 600 and improve image quality.

In image formation, the rotary drive device 620 or 620A (depicted in FIG. 1 or 5, respectively) drives the photoconductor drums 603C, 603M, 603Y, and 603K and the intermediate transfer belt 602.

Accordingly, the image forming apparatus 600 is further reliable since the image forming apparatus 600 includes the rotary drive device 620 or 620A that may provide a stable performance even when a radial load is applied to the output shaft 117 (depicted in FIG. 1).

In addition, as illustrated in FIG. 5, the planetary gear mechanism 100 and the motor 200 are provided as a unit attachable to and detachable from the image forming apparatus 600, and the second deceleration mechanism 400 and the second rotation position detector 500 are appropriately combined with the above unit or separated therefrom. Therefore, the rotary drive device 620A may be used as a variable driving device. Further, the rotary drive device 620A may be used as a driving module shared by a plurality of devices, achieving cost reduction.

Moreover, since the rotary drive device 620 or 620A includes the planetary gear mechanism 100 including multistage gears and the first rotation position detector 300 or the second rotation position detector 500, the rotary drive device 620 or 620A may be a compact unit, thereby improving flexibility of design layout of the rotary drive device 620 or 620A. As a result, the whole image forming apparatus 600 may be reduced in size while facilitating assembly thereof and providing improved maintenance and service.

As illustrated in FIG. 8, according to the above-described example embodiment, the first contact-separation mechanism 610 is provided between the primary transfer rollers 606C, 606M, and 606Y, and the rotary drive device 620 or 620A, so as to cause the primary transfer rollers 606C, 606M, and 606Y to contact and separate from the intermediate transfer belt 602. The second contact-separation mechanism 611 is provided between the secondary transfer roller 609 and the rotary drive device 620 or 620A, so as to cause the secondary transfer roller 609 to contact and separate from the intermediate transfer belt 602. However, there are another examples of the image forming apparatus 600 including the rotary drive device 620 or 620A. It is to be noted that a following contact-separation mechanism is substantially identical to the first contact-separation mechanism 610 or the second contact-separation mechanism 611.

The rotary drive device 620 or 620A may function as a driving source of the photoconductor drums 603C, 603M, 603Y, and 603K. In this case, the image forming apparatus 600 may not include the first contact-separation mechanism 610 and the second contact-separation mechanism 611.

Alternatively, the contact-separation mechanism may be provided between one roller supporting the intermediate transfer belt 602 and the rotary drive device 620 or 620A, and the intermediate transfer belt 620 may contact and separate from the photoconductor drums 603C, 603M, 603Y, and/or 603K while another roller supporting the intermediate transfer belt 602 rotates the intermediate transfer belt 620. The primary transfer rollers 606C, 606M, 606Y, and 606K provided inside a loop of the intermediate transfer belt 602 may move simultaneously. For example, a frame supports the primary transfer rollers 606C, 606M, 606Y, and 606K, and the roller supporting the intermediate transfer belt 602.

When the image forming apparatus 600 does not include the intermediate transfer belt 602 and forms an image by directly transferring the toner images formed on the photoconductor drums 603C, 603M, 603Y, and 603K to a recording sheet while a transfer belt conveys the recording sheet, the separate-contact mechanism may cause the transfer belt to contact and separate from the photoconductor drums 603C, 603M, 603Y, and/or 603K.

Alternatively, the separate-contact mechanism may be provided between the photoconductor drums 603C, 603M, 603Y, and 603K and the rotary drive device 620 or 620A to cause the photoconductor drums 603C, 603M, 603Y, and/or 603K to contact and separate from the intermediate transfer belt 602.

The rotary drive device 620 or 620A may be applied to a different type of image forming apparatus using a rotary driving force other than the image forming apparatus 600 (depicted in FIG. 8), for example, an image forming apparatus including a belt-like shaped photoconductor, an image forming apparatus for forming a monochrome image, and/or the like.

It is to be noted that an encoder may be used as a member to be detected.

As illustrated in FIGS. 1 and 5, according to the above-described example embodiments, the support shaft 118 integrally molded with the second planetary carrier 119 has a sliding contact with the shaft holes 112 of the upper and lower first planetary carrier members 103. However, the support shaft 118 may include a radial bearing or a combination of the radial bearing and a thrust bearing to have a rolling contact with the shaft holes 112. Also, although the support shafts 113 and 120 have a sliding contact with the first and second planetary gears 115 and 122, respectively, the support shafts 113 and 120 may include a radial bearing or a combination of the radial bearing and a thrust bearing to have a rolling contact with the first and second planetary gears 115 and 122.

The present invention has been described above with reference to specific example embodiments. Nonetheless, the present invention is not limited to the details of example embodiments described above, but various modifications and improvements are possible without departing from the spirit and scope of the present invention. The number, position, shape, and the like, of the above-described constituent elements are not limited to the above-described example embodiments, but may be modified to the number, position, shape, and the like, which are appropriate for carrying out the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A rotary drive device, comprising:
   a motor comprising a rotary shaft;
   a planetary gear mechanism to decelerate a rotation output of the motor at a reference reduction ratio,
   the planetary gear mechanism comprising:
   an outer gear fixed to a housing of the motor;
   multistage gears provided inside the outer gear; and
   an output shaft to transmit the decelerated rotation output of the motor to an outside of the rotary drive device; and
   a rotation position detector to detect a rotation position of the output shaft to control rotation of the motor,
   the motor, the planetary gear mechanism, and the rotation position detector combined into a single integrated unit and aligned in an axial direction of the rotary shaft of the motor.

2. The rotary drive device according to claim 1, wherein the rotation position detector comprises:
   a first dog fixed to the output shaft to spread out in a fan-like form along a circumferential direction of the output shaft at a reference angle; and
   a first sensor held by the outer gear to detect the first dog to issue an operation timing signal for controlling the motor.

3. The rotary drive device according to claim 1, wherein the planetary gear mechanism comprises:

a plurality of first planetary carrier members including an uppermost first planetary carrier member and a lowermost first planetary carrier member, stacked to provide a reference reduction ratio,
each of the plurality of first planetary carrier members comprising:
a first planetary gear to engage with the outer gear;
a first sun gear;
a first planetary carrier provided between the first planetary gear and the first sun gear; and
a shaft hole penetrating the first sun gear and the first planetary carrier;
a second planetary carrier member engaged with the uppermost first planetary carrier member,
the second planetary carrier member comprising:
a second planetary gear to engage with the outer gear;
a second planetary carrier provided between the second planetary gear and the output shaft; and
a support shaft to protrude from a side of the second planetary carrier facing the second planetary gear, the support shaft inserted into the shaft hole; and
a second sun gear attached to the rotary shaft to engage with the first planetary gear of the lowermost first planetary carrier member.

4. The rotary drive device according to claim 3, wherein the first planetary carrier is integrally molded with the first sun gear with a resin material, and
wherein the second planetary carrier, the output shaft, and the support shaft are integrally molded using a resin material.

5. The rotary drive device according to claim 1, further comprising a motor controller to power off the motor based on an operation timing signal for controlling the motor and short-circuit the motor after a reference time period elapses after the motor is powered off,
wherein the motor includes a brush.

6. A rotary drive device, comprising:
a motor comprising a rotary shaft;
a first deceleration mechanism to perform first deceleration for decelerating a rotation output of the motor at a reference reduction ratio,
the first deceleration mechanism comprising:
an outer gear fixed to a housing of the motor;
multistage gears provided inside the outer gear; and
a first output shaft to transmit the decelerated rotation output of the motor;
a second deceleration mechanism to perform second deceleration for decelerating the rotation output of the motor,
the second deceleration mechanism comprising:
a rotation output receiver removably connected to the first output shaft and to receive the rotation output of the motor;
a gear train to perform second deceleration for decelerating the rotation output of the motor received by the rotation output receiver at a reference reduction ratio; and
a second output shaft to transmit the rotation output decelerated by the gear train to an outside of the rotary drive device;
a rotation position detector to detect a rotation position of the second output shaft to control rotation of the motor; and
a case to store the second deceleration mechanism and the rotation position detector,
the motor, the first deceleration mechanism, and the second deceleration mechanism combined into a single integrated unit.

7. The rotary drive device according to claim 6, wherein the rotation position detector comprises:
a member to be detected provided on the second output shaft; and
a sensor provided between gears of the gear train and held by the case to detect the member to be detected.

8. The rotary drive device according to claim 6, wherein the rotation position detector comprises:
a second dog provided on a side surface of a gear rotating the second output shaft to spread out in a convex form along a circumferential direction of the gear at a reference angle; and
a second sensor held by the case to detect the second dog to issue an operation timing signal for controlling the motor.

9. An image forming apparatus, comprising:
a rotary drive device, the rotary drive device including:
a motor comprising a rotary shaft;
a planetary gear mechanism to decelerate a rotation output of the motor at a reference reduction ratio, the planetary gear mechanism comprising
an outer gear fixed to a housing of the motor,
multistage gears provided inside the outer gear,
an output shaft to transmit the decelerated rotation output of the motor to an outside of the rotary drive device, and
a rotation position detector to detect a rotation position of the output shaft to control rotation of the motor, the motor, the planetary gear mechanism, and the rotation position detector combined into a single integrated unit and aligned in an axial direction of the rotary shaft of the motor; and
a rotatable photoconductor driven by the rotation output of the rotary drive device to form a latent image and a toner image.

10. An image forming apparatus, comprising:
a rotary drive device, the rotary drive device including:
a motor comprising a rotary shaft;
a planetary gear mechanism to decelerate a rotation output of the motor at a reference reduction ratio, the planetary gear mechanism comprising
an outer gear fixed to a housing of the motor,
multistage gears provided inside the outer gear,
an output shaft to transmit the decelerated rotation output of the motor to an outside of the rotary drive device, and
a rotation position detector to detect a rotation position of the output shaft to control rotation of the motor, the motor, the planetary gear mechanism, and the rotation position detector combined into a single integrated unit and aligned in an axial direction of the rotary shaft of the motor;
a transfer belt to carry a toner image;
a primary transfer roller to transfer the toner image onto the transfer belt; and
a contact-separation mechanism provided between the primary transfer roller and the rotary drive device to cause the primary transfer roller to contact and separate from the transfer belt.

11. An image forming apparatus, comprising:
a rotary drive device, the rotary drive device including:
a motor comprising a rotary shaft;
a planetary gear mechanism to decelerate a rotation output of the motor at a reference reduction ratio, the planetary gear mechanism comprising
an outer gear fixed to a housing of the motor,
multistage gears provided inside the outer gear, and an output shaft to transmit the decelerated rotation output of the motor to an outside of the rotary drive device, and a rotation position detector to detect a rotation position of the output shaft to control rotation of the motor, the motor, the planetary gear mechanism, and the rotation position detector combined into a single integrated unit and aligned in an axial direction of the rotary shaft of the motor;

a transfer belt to carry a toner image;

a secondary transfer roller to transfer the toner image carried by the transfer belt onto a recording material; and a contact-separation mechanism provided between the secondary transfer roller and the rotary drive device to cause the secondary transfer roller to contact and separate from the transfer belt.

12. An image forming apparatus, comprising:

a rotary drive device, the rotary drive device including:

a motor comprising a rotary shaft;

a planetary gear mechanism to decelerate a rotation output of the motor at a reference reduction ratio, the planetary gear mechanism comprising an outer gear fixed to a housing of the motor, multistage gears provided inside the outer gear, and an output shaft to transmit the decelerated rotation output of the motor to an outside of the rotary drive device, and a rotation position detector to detect a rotation position of the output shaft to control rotation of the motor, the motor, the planetary gear mechanism, and the rotation position detector combined into a single integrated unit and aligned in an axial direction of the rotary shaft of the motor;

a photoconductor to form a toner image;

a transfer belt to carry the toner image transferred from the photoconductor; and a contact-separation mechanism provided between the transfer belt and the rotary drive device to cause the transfer belt to contact and separate from the photoconductor.

* * * * *